US012604310B2

(12) United States Patent
Park et al.

(10) Patent No.: US 12,604,310 B2
(45) Date of Patent: Apr. 14, 2026

(54) MINIMIZATION OF UL DROPPING DUE TO COLLISION WITH MEASUREMENT GAPS FOR UES

(71) Applicant: QUALCOMM Incorporated, San Diego, CA (US)

(72) Inventors: Changhwan Park, San Diego, CA (US); Xiao Feng Wang, San Diego, CA (US); Liangping Ma, San Diego, CA (US); Bharat Shrestha, San Diego, CA (US); Jae Ho Ryu, San Diego, CA (US); Rebecca Wen-Ling Yuan, San Diego, CA (US); Sanghoon Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 727 days.

(21) Appl. No.: 17/933,759

(22) Filed: Sep. 20, 2022

(65) Prior Publication Data

US 2024/0098734 A1      Mar. 21, 2024

(51) Int. Cl.
*H04W 72/1268* (2023.01)
*H04W 8/24* (2009.01)
*H04W 72/542* (2023.01)

(52) U.S. Cl.
CPC ......... *H04W 72/1268* (2013.01); *H04W 8/24* (2013.01); *H04W 72/542* (2023.01)

(58) Field of Classification Search
CPC . H04W 72/1268; H04W 8/24; H04W 72/542; H04W 24/10; H04W 72/51; H04W 72/566; H04W 84/06; H04W 36/0088
See application file for complete search history.

(56) References Cited

U.S. PATENT DOCUMENTS

2020/0015246 A1    1/2020    Vilaipornsawai et al.
2021/0378020 A1    12/2021    Wang
(Continued)

FOREIGN PATENT DOCUMENTS

WO        2021090980 A1    5/2021

OTHER PUBLICATIONS

Fujitsu: "Survival Time Mode and Measurement Gap", 3GPP TSG-RAN WG2 Meeting #117 electronic, R2-2202284, 3rd Generation Partnership Project, Mobile Competence Centre, 650, Route Des Lucioles, F-06921 Sophia-Antipolis Cedex, France, vol. RAN WG2, No. electronic Feb. 21-Mar. 4, 2022, Feb. 14, 2022, 3 Pages, XP052110293, The Whole Document.
(Continued)

*Primary Examiner* — Joseph E Avellino
*Assistant Examiner* — Adam Joel Cerlanek
(74) *Attorney, Agent, or Firm* — Procopio, Cory, Hargreaves & Savitch LLP

(57)        ABSTRACT

A method of wireless communication at UE is disclosed herein. The method includes transmitting at least one of a first indication including UE capability information indicating that the UE is capable of transmitting in UL during one or more MGs or a second indication including information indicating a first set of slots corresponding to the one or more MGs. The method includes obtaining a configuration to transmit a set of UL transmissions based on at least one of the first indication or the second indication. The method includes transmitting, based on the configuration, the set of UL transmissions in the first set of slots corresponding to the one or more MGs.

30 Claims, 12 Drawing Sheets

(56) References Cited

U.S. PATENT DOCUMENTS

2022/0225462 A1* 7/2022 Manolakos ........... H04W 24/10
2023/0350078 A1* 11/2023 Cozzo ................. H04W 56/001
2024/0260092 A1* 8/2024 Prasad ................. H04L 1/1887
2025/0081231 A1* 3/2025 Guo ................. H04W 74/0808

OTHER PUBLICATIONS

Huawei, et al., "Handling of URLLC Data in UL During Measurement Gaps", 3GPP TSG-RAN WG2 Meeting AH-1807, R2-1810226, 3rd Generation Partnership Project, Mobile Competence Centre, 650, Route Des Lucioles, F-06921 Sophia-Antipolis Cedex, France, vol. RAN WG2, No. Montreal, Canada, Jul. 2-Jul. 6, 2018, Jul. 1, 2018, 3 Pages, XP051467413, The Whole Document.
International Search Report and Written Opinion—PCT/US2023/029037—ISA/EPO—Nov. 8, 2023.

* cited by examiner

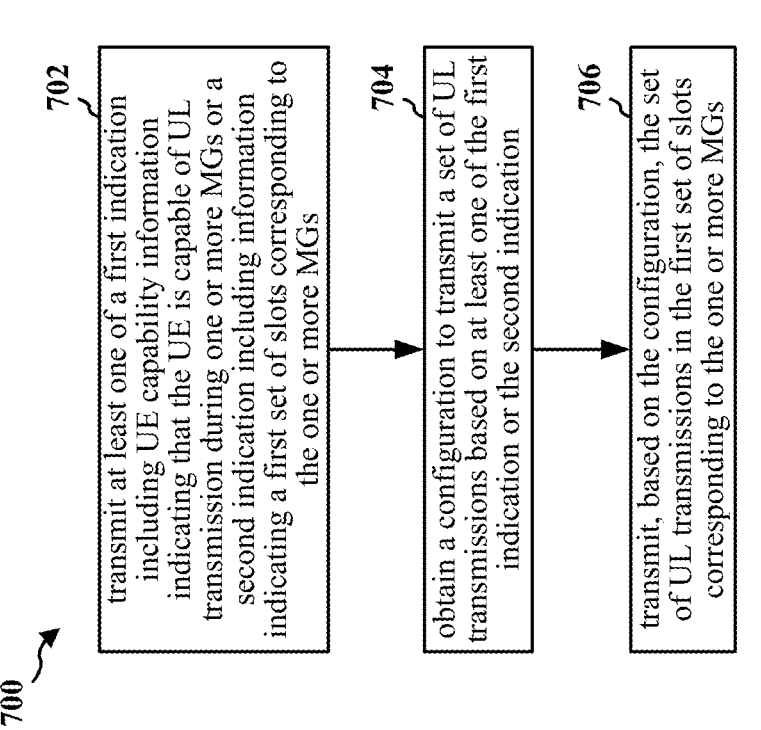

702  transmit at least one of a first indication including UE capability information indicating that the UE is capable of UL transmission during one or more MGs or a second indication including information indicating a first set of slots corresponding to the one or more MGs 704  obtain a configuration to transmit a set of UL transmissions based on at least one of the first indication or the second indication 706  transmit, based on the configuration, the set of UL transmissions in the first set of slots corresponding to the one or more MGs

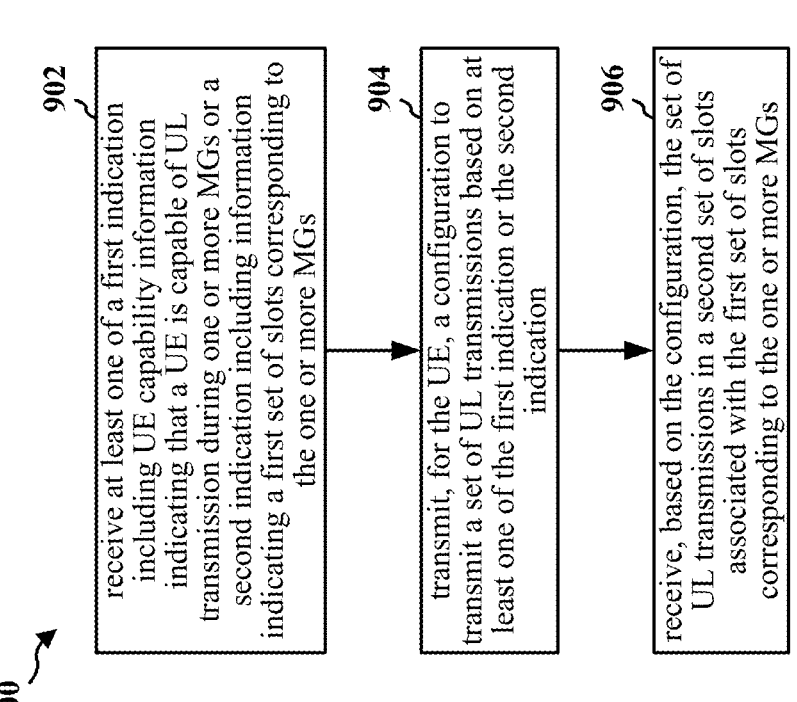

900

902 receive at least one of a first indication including UE capability information indicating that a UE is capable of UL transmission during one or more MGs or a second indication including information indicating a first set of slots corresponding to the one or more MGs

904 transmit, for the UE, a configuration to transmit a set of UL transmissions based on at least one of the first indication or the second indication

906 receive, based on the configuration, the set of UL transmissions in a second set of slots associated with the first set of slots corresponding to the one or more MGs

FIG. 9

MINIMIZATION OF UL DROPPING DUE TO COLLISION WITH MEASUREMENT GAPS FOR UES

TECHNICAL FIELD

The present disclosure relates generally to communication systems, and more particularly, to measurement gaps (MGs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus includes a memory and at least one processor coupled to the memory and, based at least in part on first information stored in the memory, the at least one processor is configured to: transmit at least one of a first indication including UE capability information indicating that the UE is capable of uplink (UL) transmission during one or more measurement gaps (MGs) or a second indication including information indicating a first set of slots corresponding to the one or more MGs; obtain a configuration to transmit a set of UL transmissions based on at least one of the first indication or the second indication; and transmit, based on the configuration, the set of UL transmissions in the first set of slots corresponding to the one or more MGs.

In an aspect of the disclosure, a method, a computer-readable medium, and an apparatus are provided for wireless communication at a network node are provided. The apparatus includes a memory and at least one processor coupled to the memory and, based at least in part on first information stored in the memory, the at least one processor is configured to: receive at least one of a first indication including user equipment (UE) capability information indicating that a UE is capable of uplink (UL) transmission during one or more measurement gaps (MGs) or a second indication including information indicating a first set of slots corresponding to the one or more MGs; transmit, for the UE, a configuration to transmit a set of UL transmissions based on at least one of the first indication or the second indication; and receive, based on the configuration, the set of UL transmissions in a second set of slots associated with the first set of slots corresponding to the one or more MGs.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart of a method of wireless communication.

FIG. 9 is a flowchart of a method of wireless communication.

DETAILED DESCRIPTION

Figure 1:
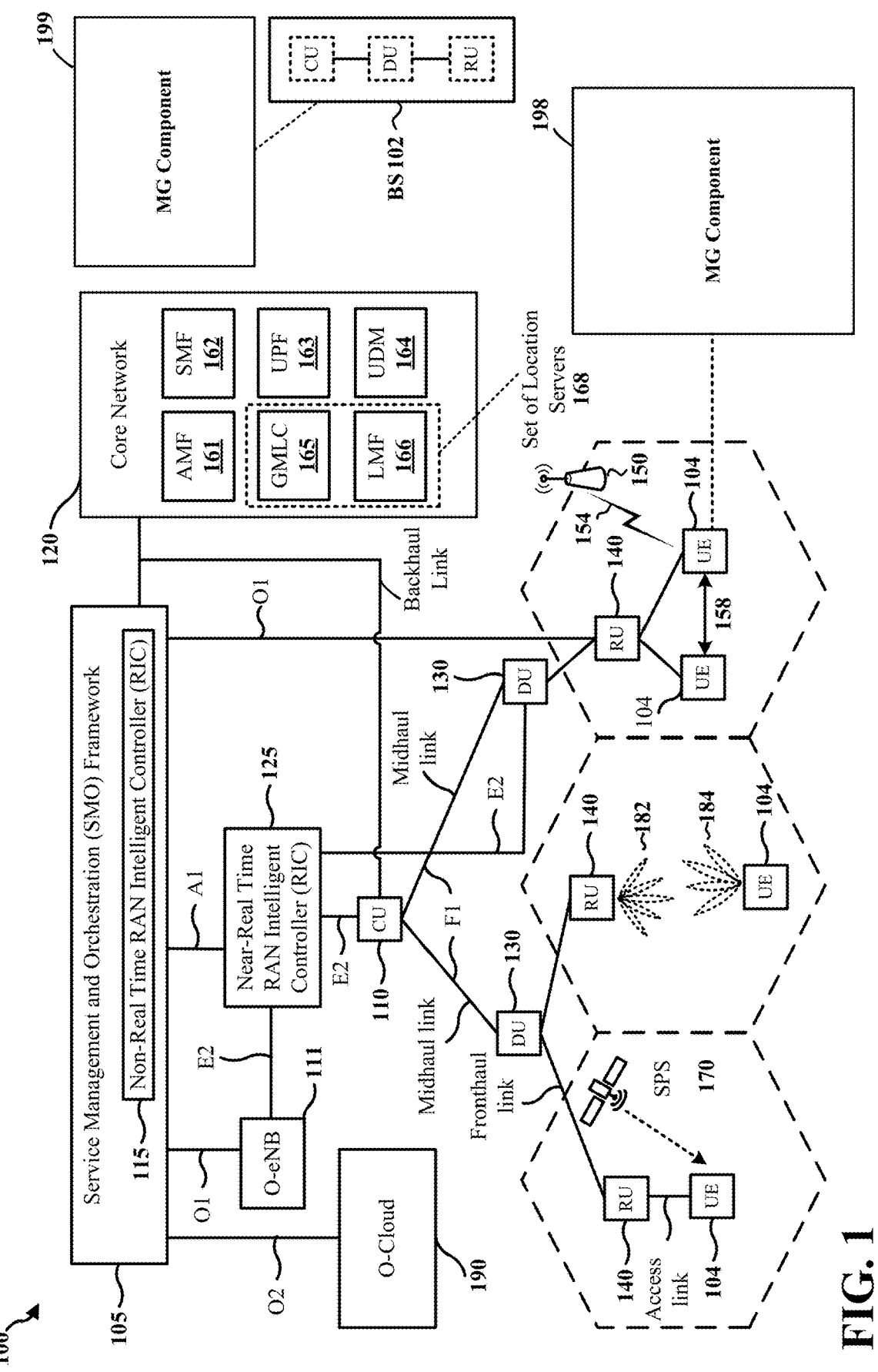
FIG. 1 is a diagram illustrating an example of a wireless communications system and an access network.

A UE may be configured/scheduled to transmit repetitions of a UL transmission in order to increase cell coverage. A repetition may refer to a same encoded transport block that is transmitted more than one time without hybrid automatic repeat request (HARQ) feedback, that is, one scheduling grant may trigger multiple transmissions of one encoded TB over multiple slots. However, the UE may not transmit repetitions of a UL transmission during a MG. Instead, the UE may switch carriers (e.g., to a carrier associated with a non-serving cell) and perform a measurement on the carrier. A base station may attempt to configure/schedule the UE to transmit UL repetitions that do not collide with MGs based on a TA of the UE. If a MG collides with a configured/scheduled UL repetition, the UL repetition may be dropped by the UE, which may lead to a communications reliability issue between the UE and the base station. Various technologies pertaining to minimizing dropping of UL repetitions due to collisions with MGs are described herein. In an example, a UE transmits at least one of a first indication including UE capability information indicating that the UE is capable of UL transmission during one or more MGs or a second indication including information indicating a first set of slots corresponding to the one or more MGs. The UE obtains a configuration to transmit a set of UL repetitions based on at least one of the first indication or the second indication. The UE transmits, based on the configuration, the set of UL repetitions in the first set of slots corresponding to the one or more MGs. Vis-à-vis transmitting the first indication and/or the second indication, the UE may be able to receive a configuration that may enable the UE to transmit the set of UL repetitions in the first set of slots corresponding to the one or more MGs. This may lead to the UE dropping less UL repetitions during MGs in comparison to other UEs, which may lead to increased communications reliability between the UE and a network, such as when the network is a NTN.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (e.g., a gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF)

access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a MG component 198 that is configured to transmit at least one of a first indication including UE capability information indicating that the UE is capable of UL transmission during one or more MGs or a second indication including information indicating a first set of slots corresponding to the one or more MGs; obtain a configuration to transmit a set of UL transmissions based on at least one of the first indication or the second indication; and transmit, based on the configuration, the set of UL transmissions in the first set of slots corresponding to the one or more MGs. In certain aspects, the base station 102 may include a MG component 199 that is configured to receive at least one of a first indication including UE capability information indicating that a UE is capable of UL transmission during one or more MGs or a second indication including information indicating a first set of slots corresponding to the one or more MGs; transmit, for the UE, a configuration to transmit a set of UL transmissions based on at least one of the first indication or the second indication; and receive, based on the configuration, the set of UL transmissions in a second set of slots associated with the first set of slots corresponding to the one or more MGs. Although the following description may be focused on NTNs, the concepts described herein may be applicable to terrestrial networks as well. Although the following description may be focused on 5G NR, the concepts described herein may be applicable to other similar areas, such as LTE, LTE-A, CDMA, GSM, and other wireless technologies.

Figures 2A, 2B, 2C, 2D:
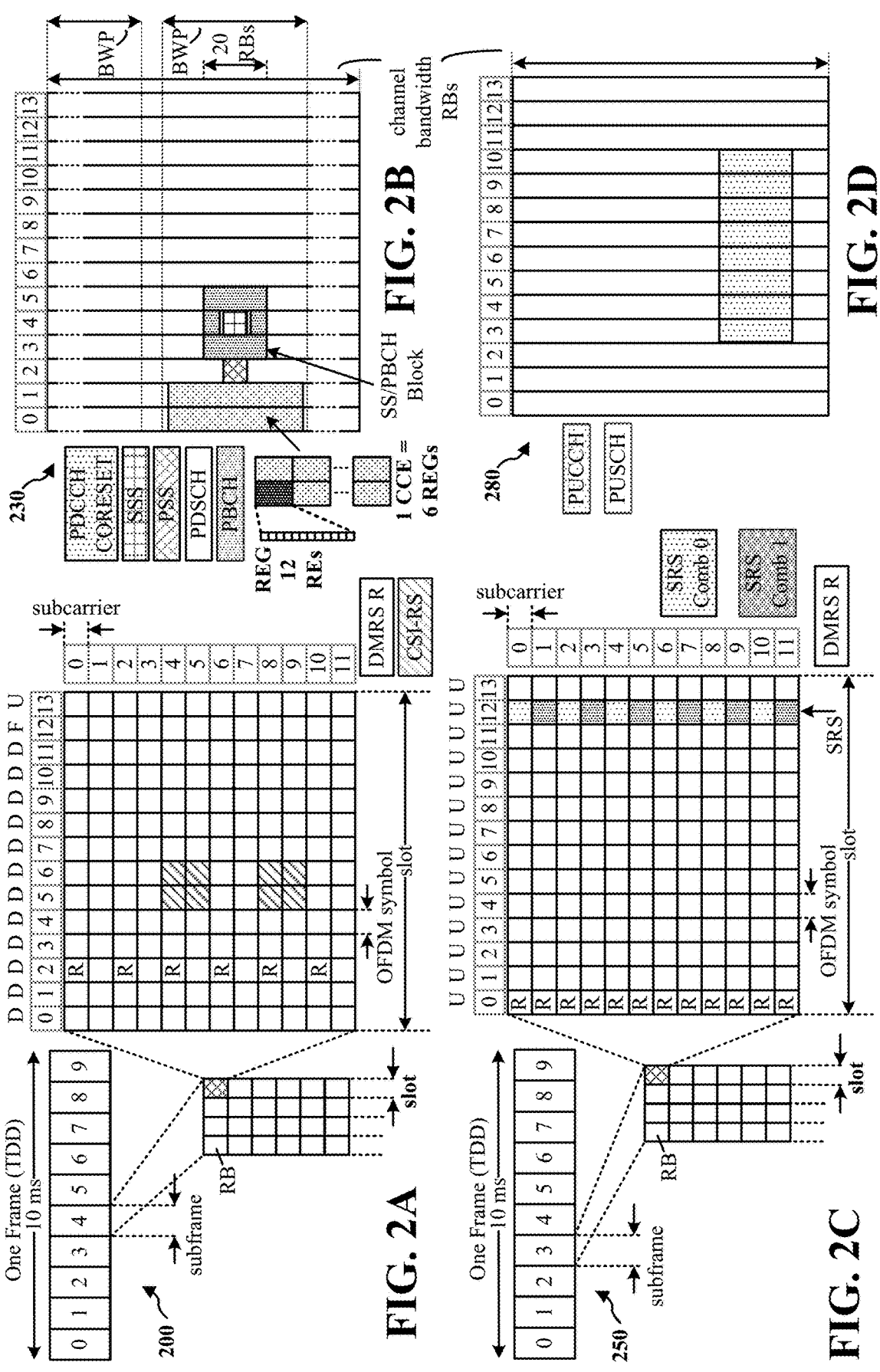
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
| --- | --- | --- |
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
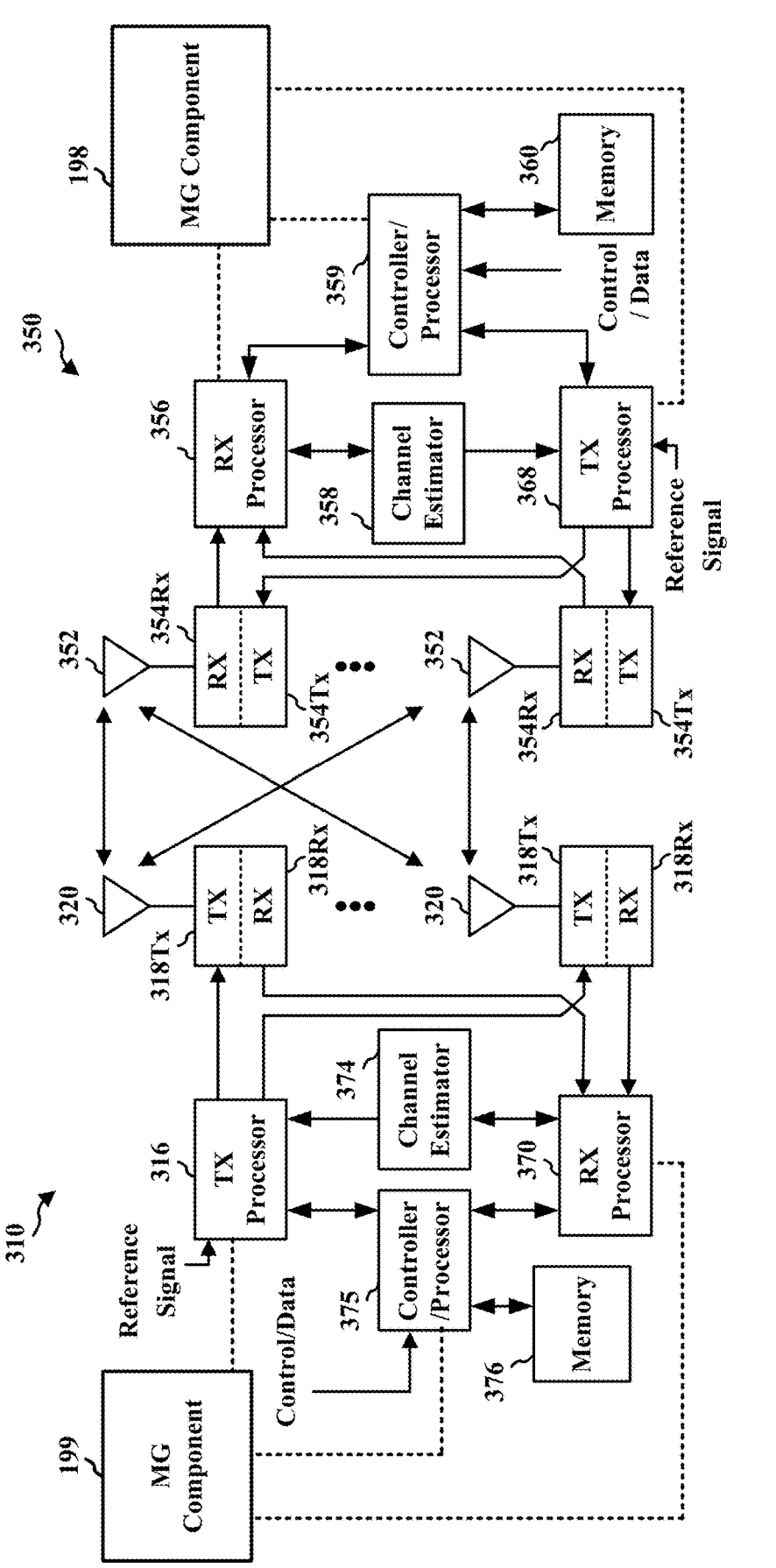
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the MG component 198 of FIG. 1.

At least one of the TX processor 316, the RX processor 370, and the controller/processor 375 may be configured to perform aspects in connection with the MG component 199 of FIG. 1.

Figure 4:
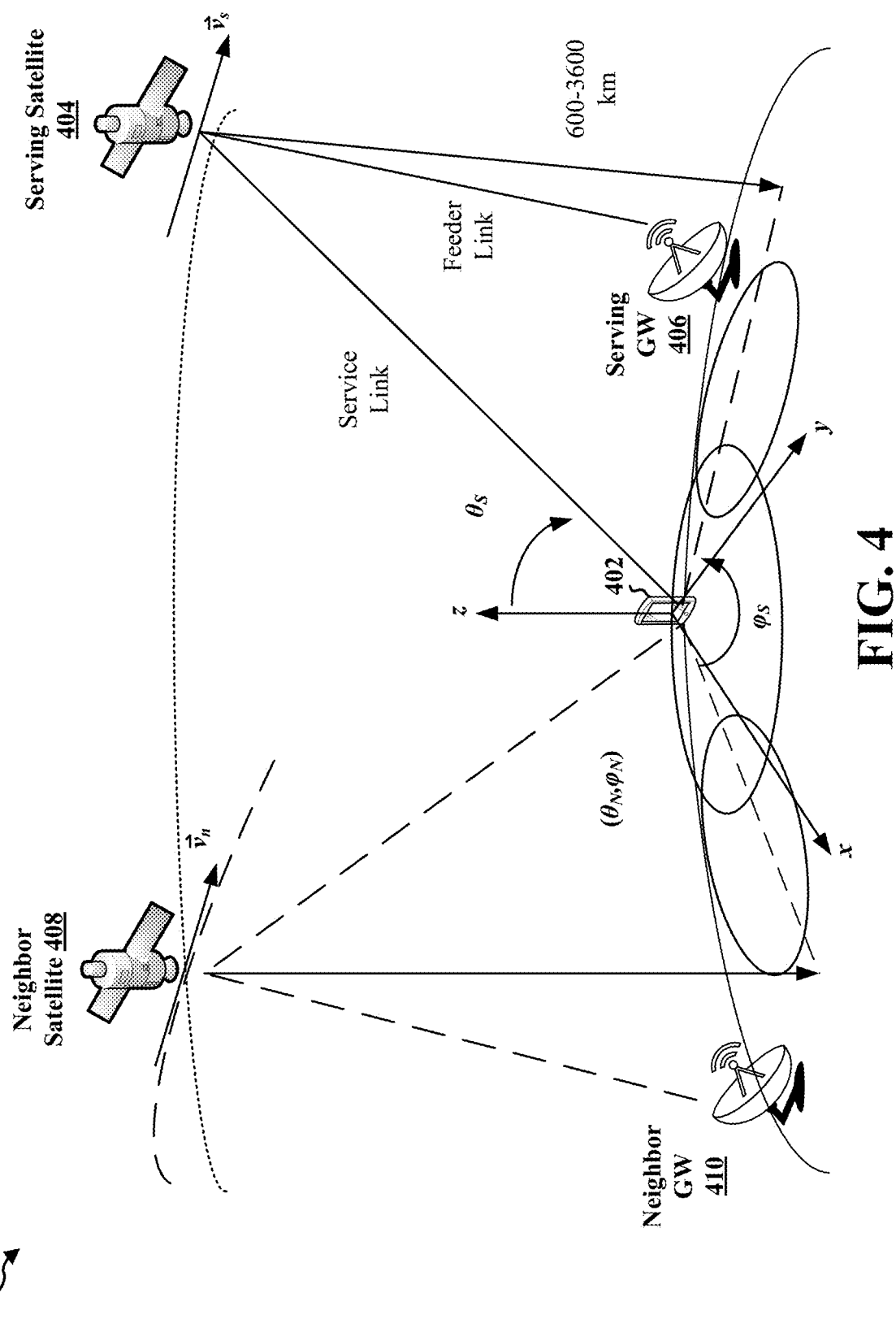
FIG. 4 is a diagram illustrating an example of a non-terrestrial network (NTN).

FIG. 4 is a diagram illustrating an example of a NTN. The NTN may include a UE 402, a serving satellite 404, and a serving gateway (GW) 406. In general, the UE 402 and the serving GW 406 may communicate via the serving satellite 404. The serving satellite 404 may orbit around the Earth. In an example, a service link may exist between the UE 402 and the serving satellite 404 and a feeder link may exist between the serving GW 406 and the serving satellite 404. The serving GW 406 may be or include a gNB. The NTN may utilize FR1 for communications. The term "NTN" may refer to a 3GPP based cellular system that is served via a satellite, where information of the satellite as to at least a distance between a UE and the satellite is broadcast through system information. In an example, a distance between the UE 402 and the serving satellite 404 may range from 600 to 3600 km. Communications transmitted via the NTN may be associated with a relatively large propagation delay and a relatively large path loss. To account for the relatively large propagation delay, the UE 402 may transmit UL transmissions with a timing advance (TA) such that UL and DL transmissions align with symbol/slot boundaries as observed by the serving GW 406. The UE 402 may be configured/scheduled with a relatively large number of repetitions (e.g., UL repetitions, such as PUSCH repetitions) to account for the path loss.

The NTN may also include a neighbor satellite 408 and a neighbor GW 410. The neighbor satellite 408 and the neighbor GW 410 may be similar to the serving satellite 404 and the serving GW 406 described above. In an example, the UE may communicate with the neighbor GW 410 via the neighbor satellite 408 (as opposed to the serving satellite 404 and the serving GW 406) when the UE 402 moves from a first location to a second location.

Figure 5:
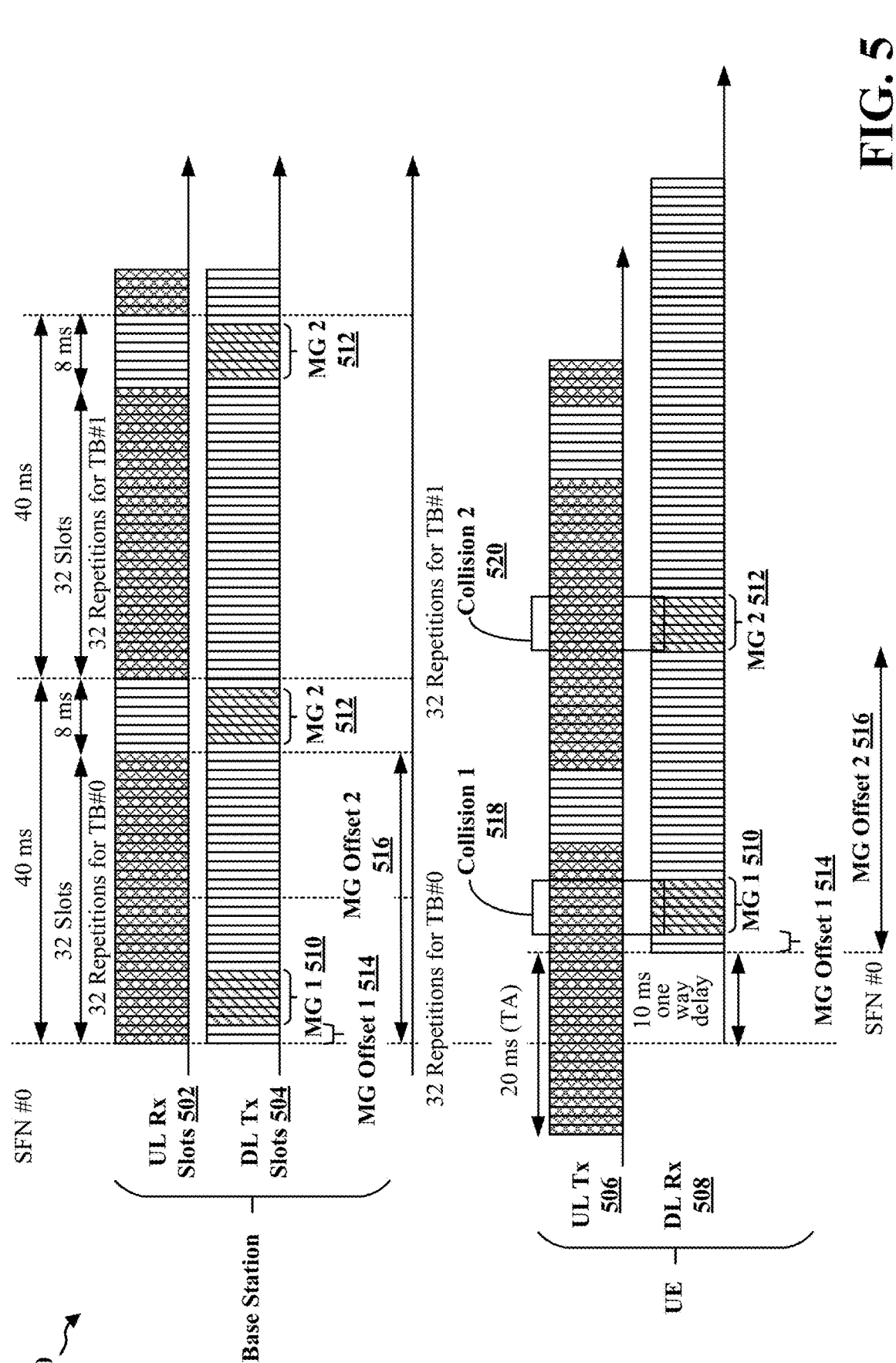
FIG. 5 is a diagram illustrating an example of UL reception (Rx) slots and DL transmission (Tx) slots as observed by a base station and a UE.

FIG. 5 is a diagram 500 illustrating an example of UL Rx slots and DL Tx slots as observed by a base station and a UE. The diagram 500 depicts base station UL Rx slots 502, base station DL Tx slots 504, UE UL Tx slots 506, and UE DL Rx slots 508. Slots are illustrated as rectangles in the diagram 500. The base station UL Rx slots 502 and base station DL Tx slots 504 may also be slots as observed from a synchronization reference point (SRP) that occurs between a satellite and the base station on a feeder link. The base station UL Rx slots 502 and the base station DL Tx slots 504 may be time aligned. The UE may communicate in a TDD mode or a FDD mode. In a NTN, a UE may communicate in FDD mode. In an Internet of Things (IoT) based NTN (e.g., for LTE eMTC and narrowband Internet of Things (NB-IOT)), a UE may communicate in half duplex FDD. In a NR based NTN (NR-NTN), a redcap UE may communicate in half duplex FDD. In a NR-NTN, a UE may communicate in full duplex FDD.

To account for path loss (e.g., path loss associated with a NTN), a UE may be configured/scheduled to transmit UL repetitions (indicated by crosshatched rectangles in FIG. 5) to a base station. The UE may transmit the UL repetitions using a TA (e.g., 20 ms) in order to account for a propagation delay between the UE and the base station. Each repetition may occupy a slot. In an example, the UL repetitions may be PUSCH repetitions. In the example illustrated in the diagram 500, the UE may be configured/scheduled to transmit 32 repetitions for transport block (TB) 0 and 32 repetitions for TB 1. In an example, the UE may be scheduled/configured to transmit a relatively large number of PUSCH repetitions when the UE is transmitting voice over new radio (VoNR) related data.

The UE may also be configured/scheduled with MGs. In general, a network may refrain from transmitting/receiving data/signals to/from a UE (e.g., a cell associated with the base station) during a MG. Instead, the UE may perform measurements on reference signals associated with neighboring (non-serving) cells during the MG (or a portion thereof). In an example, the UE may switch carriers from a first carrier to a second carrier when the MG gap begins, perform measurements on reference signals associated with the second carrier, and switch back to the first carrier when the MG ends. The UE may refrain from transmitting/receiving data to/from the serving cell during the MG due to a DL radio frequency (RF) retuning (for measurement purposes) causing interruptions to other carriers (DL and UL) and due positions of the interruptions being unknown to a network. In one aspect, a UE may be configured/scheduled with up to two concurrent MGs that each have a relatively large length. A MG may have a measurement gap length (MGL) and a measurement gap repetition period (MGRP). MGL may refer to a number of slots that the MG occupies. MGRP may refer to a periodicity of the MG. A MG may have a MG offset that indicates a start of the MGRP.

In one aspect, during a MG, the UE may not conduct reception/transmission from/to a corresponding evolved universal terrestrial radio access network (E-UTRAN) PCell, E-UTRAN SCell(s), and NR serving cells for E-UTRA-NR dual connectivity except for the reception of signals used for radio resource management (RRM) measurement(s) and signals used for random access procedures. In one aspect, during a MG, the UE may not conduct reception/transmission from/to corresponding NR serving cells for stand-alone (SA) (with a single carrier or carrier aggregation configured) except for reception of signals used for RRM measurement(s), positioning reference signal (PRS) measurement(s), and signals used for random access procedures. In one aspect, during a MG, a UE may not conduct reception/transmission from/to a corresponding PCell, SCell(s) and E-UTRAN serving cells for new radio evolved universal terrestrial radio access (NR-E-UTRA) dual connectivity except for reception of signals used for RRM measurement(s), PRS measurement(s), and signals used for random access procedures. In one aspect, during a MG, the UE may not conduct reception/transmission from/to corresponding NR serving cells for new radio dual connectivity (NR-DC) except for reception of signals used for RRM measurement(s), PRS measurement(s), and signals used for random access procedures.

In an example depicted in the diagram 500, the UE may be configured/scheduled with a first MG 510 and a second MG 512. The first MG 510 and the second MG 512 are indicated in the diagram 500 by rectangles filled with diagonal lines. In an example, the first MG 510 may have a MGL of 6 (i.e., the first MG 510 occupies 6 slots) and a MGRP of 80 (i.e., the first MG 510 repeats every 80 slots) and the second MG 512 may have a MGL of 6 (i.e., the second MG 512 occupies 6 slots) and a MGRP of 40 (i.e., the second MG 512 repeats every 40 slots). The first MG 510 may be associated with a first MG offset 514 and the second MG 512 may be associated with a second MG offset 516. The first MG offset 514 and the second MG offset 516 may be defined with respect to a SFN, a subframe, or a slot.

As illustrated in the diagram 500, the first MG 510 may collide with a portion of the UL repetitions of transport block 0 (i.e., a first collision 518 may occur) and the second MG 512 may collide with a portion of the UL repetitions of transport block 1 (i.e., a second collision 520 may occur). When a MG collides with a set of configured/scheduled UL repetitions, the UE may refrain from transmitting the configured/scheduled UL repetitions and instead may perform measurements on reference signals associated with non-serving cells of the UE.

MGs may be associated with performance loss in terms of signal to noise ratio (SNR) per TB. In one example, if a number of repetitions for a TB is equal to 32 and a MG is 6 slots long (i.e., the MGL of the MG is 6), 18.75% of the TB may not be transmitted. This may lead to a 0.9 dB loss in SNR per TB. In another example, if a number of repetitions for a TB is equal to 32 and a MG is 2 slots long (i.e., the MGL of the MG is 2), 6.25% of the TB may not be transmitted. This may lead to a 0.28 dB loss in SNR per TB. In one example, if a number of repetitions for a TB is equal to 16 and a MG is 6 slots long (i.e., the MGL of the MG is 6), 37.5% of the TB may not be transmitted. This may lead to a 2.04 dB loss in SNR per TB. In another example, if a number of repetitions for a TB is equal to 16 and a MG is 2 slots long (i.e., the MGL of the MG is 2), 12.5% of the TB may not be transmitted. This may lead to a 0.58 dB loss in SNR per TB. In one example, if a number of repetitions for a TB is equal to 8 and a MG is 6 slots long (i.e., the MGL of the MG is 6), 75% of the TB may not be transmitted. This may lead to a 6.02 dB loss in SNR per TB. In another example, if a number of repetitions for a TB is equal to 8 and a MG is 2 slots long (i.e., the MGL of the MG is 2), 1.25% of the TB may not be transmitted. This may lead to a 1.25 dB loss in SNR per TB. The losses described may be greater as the MGRP of the MG decreases (e.g., when an MGRP of the MG is 20 ms).

As noted above, a UE may be configured/scheduled to dynamically or semi-statically transmit repetitions of a UL transmission (e.g., a PUSCH transmission) in order to increase cell coverage. However, the UE may not transmit repetitions of a UL transmission during a MG. Instead, the UE may switch carriers (e.g., to a carrier associated with a non-serving cell) and perform a measurement a reference signal associated with the carrier. Stated differently, the UE may not transmit or receive data/signals from the serving cell during the MG. A base station may attempt to configure/ schedule the UE to transmit UL repetitions that do not collide with MGs based on a TA of the UE; however, collisions may still occur even if the base station obtains/ derives the TA with a granularity of 1 ms. If a MG collides with a configured/scheduled UL repetition, the UL repetition may be dropped by the UE, which may lead to a communications reliability issue between the UE and the base station.

Various technologies pertaining to minimizing dropping of UL repetitions due to collisions with MGs are described herein. In an example, a UE transmits at least one of a first indication including UE capability information indicating that the UE is capable of UL transmission during one or more MGs or a second indication including information indicating a first set of slots corresponding to the one or more MGs. The term UE capability information may refer to data that indicates that the UE is capable of UL transmission during one or more MGs. The UE obtains a configuration to transmit a set of UL transmissions based on at least one of the first indication or the second indication. The UE transmits, based on the configuration, the set of UL transmissions in the first set of slots corresponding to the one or more MGs. Vis-à-vis transmitting the first indication and/or the second indication, the UE may be able to receive a configuration that may enable the UE to transmit the set of UL transmissions (e.g., a set of UL repetitions) in the first set of slots corresponding to the one or more MGs. This may lead to the UE dropping less UL repetitions during MGs in comparison to other UEs, which may lead to increased communications reliability between the UE and a network, such as when the network is a NTN.

Figure 6:
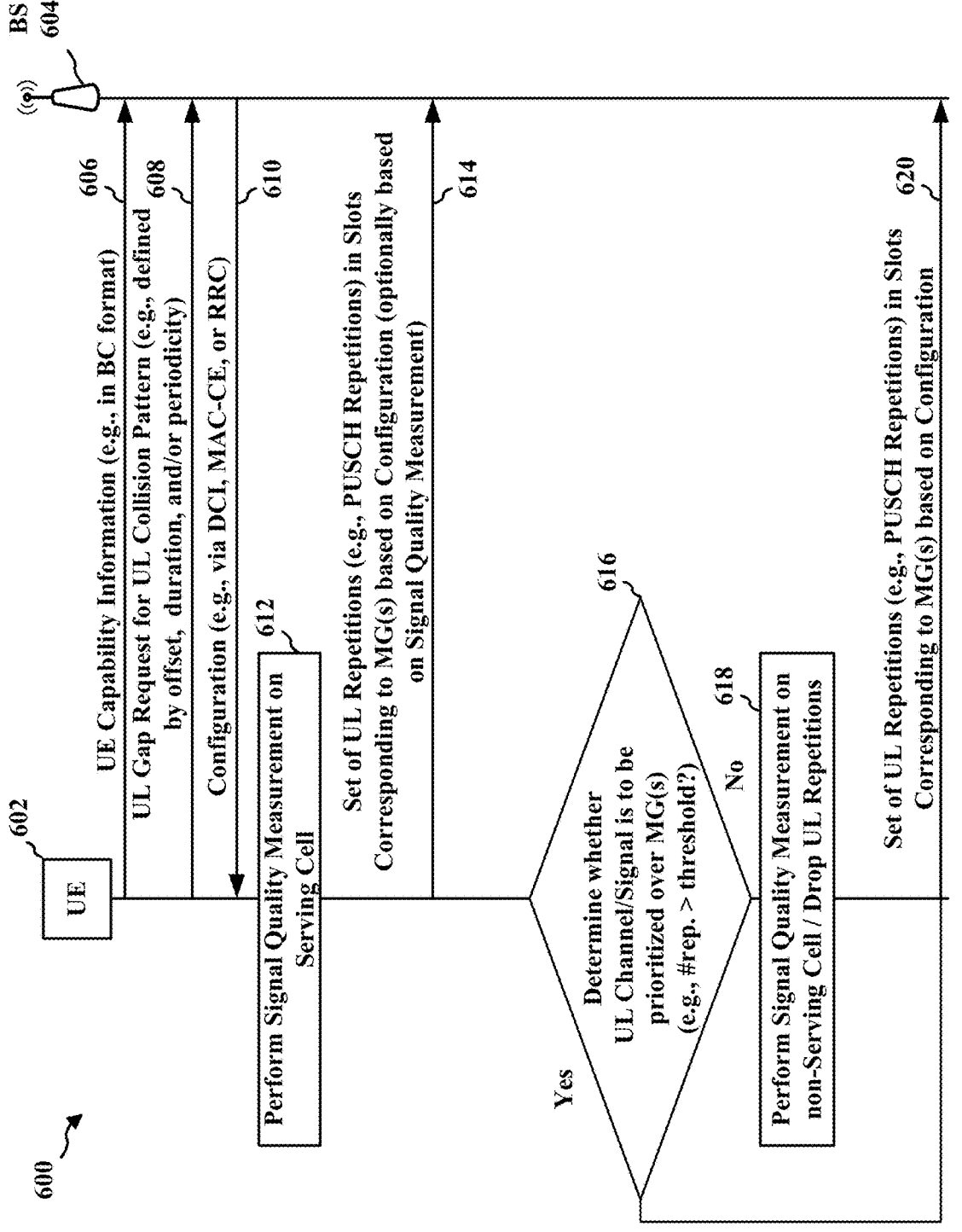
FIG. 6 is a communications flow diagram illustrating example communications between a UE and a base station.

FIG. 6 is a communications flow diagram 600 that illustrates example communications between a UE 602 and a base station 604. In an example, the UE 602 and the base station 604 may be part of a NTN, such as the NTN described in the description of FIG. 4. In an example, the UE 602 may be the UE 402 and the base station 604 may be the serving GW 406. In an example, the base station 604 may be associated with a serving cell of the UE 602.

At 606, the UE 602 may transmit UE capability information to the base station 604. The UE capability information may indicate that the UE 602 is capable of UL transmission during a MG (or during MGs). The UE capability information may indicate that there may be two instances in which UL transmission quality may degrade. Each instance may be X ms in duration, where X is a positive number. In a first instance, X may be 1 ms or a sub-slot length. In a second instance, if degradation of signal quality (e.g., as determined by an error vector magnitude (EVM) measurement) within X ms is less than Y dB (where Y is a number), the UE 602 may drop UL transmissions during the X ms.

The UE capability information may indicate positions in a time domain (e.g., slots) that the UE 602 is capable of UL transmission during a MG (or MGs). For instance, the positions in the time domain may be based on an implementation of the UE 602. The UE capability information may be defined in a band-combination (BC) format. The UE 602 may update the UE capability information upon a reconfiguration of a MG or upon receiving a measurement configuration.

At 608, the UE 602 may transmit a UL gap request for a UL collision pattern to the base station 604. The UL collision pattern may represent a set of UL slots in which the UE 602 may not be able to conduct UL transmissions. The collision pattern may be associated with a TA of the UE 602. In one aspect, the UL collision pattern may indicate a set of UL slot indices that collide with configured/activated MG(s) from a perspective of the UE 602. A UL TA may be considered when determining the set of UL slot indices that collide. In one aspect, the UL collision pattern may indicate a set of UL slot indices that may collide with configured/activated MGs due to a UL EVM measurement degrading by more than Z dB (Z is a number) due to RF retuning occurring within the configured/activated MG(s) from a perspective of the UE 602. In an example, a value of Z may be defined in a specification. In another example, the base station 604 may signal the value of Z to the UE 602 via a downlink control information (DCI), a medium access control (MAC) control element (MAC-CE), or RRC signaling.

The UL gap request for the UL collision pattern may be characterized by an offset, a duration, and a periodicity. The offset may be an offset with respect to a beginning of a SFN, a subframe, or a slot. The duration may be a number of slots. The periodicity may refer to how often the UL collision pattern occurs. In an aspect in which there are multiple non-consecutive UL collision patterns, the UL collision pattern may be characterized by more than one duration or the duration may be replaced with a bitmap having a length which is equal to or shorter than a length of the periodicity.

At 610, the UE 602 receives a configuration from the base station 604. The configuration may be received via a DCI, a MAC-CE, or RRC signaling. In one aspect, the configuration may be based on the UE capability information transmitted at 606. In another aspect, the configuration may be based on the UL gap request for the UL collision pattern transmitted at 608. In yet another aspect, the configuration may indicate that a set of UL channels and/or signals are to be prioritized over a MG, that is, the MG is to be temporarily disabled for a slot when a collision between a UL channel/signal and the MG occurs. When the MG is disabled, the UE 602 may transmit UL repetitions in the slots corresponding to the disabled MG.

In one aspect, a prioritization rule may depend on a number of repetitions associated with the UL channel/signal. In an example, if a number of repetitions for a UL channel/signal is greater than N (N is an integer), the UE 602 may prioritize UL transmissions over the colliding MG, that is, the UE 602 may transmit UL transmission in the slots for the MG. The prioritization rule may be signaled by a network associated with the base station 604 using a dynamic grant, a MAC-CE, or RRC signaling. In another example, if the number of repetitions for the UL channel/signal is less than or equal to N, the UE 602 may prioritize UL transmissions over the colliding MG. In a further example, if a ratio of a total number of collisions to a total number of scheduled repetitions is greater than R (R is greater than zero and less than one), the UE 602 may prioritize UL transmissions over the colliding MG At 612, the UE 602 may perform a signal quality measurement on a serving cell associated with the base station 604. For instance, the UE 602 may perform the signal quality measurement on a reference signal associated with the serving cell. At 614, the UE 602 may transmit a set of UL repetitions in slots corresponding to MGs of the UE 602 based on the configuration received at 610. In an example, the set of UL repetitions may be PUSCH repetitions. In one aspect, transmitting the set of UL repetitions may additionally be based on the signal quality measurement performed on the serving cell. For example, if the signal quality measurement is less than a threshold value, the UE 602 may transmit the set of UL repetitions.

In one aspect, at 616, the UE 602 may determine whether a UL channel/signal is to be prioritized over the MG based on the configuration received at 610 (i.e., based on the prioritization rule described above). If the UL channel/signal is not to be prioritized over the MG, at 618, the UE 602 may perform signal quality measurements on a reference signal associated with a non-serving cell (e.g., a cell associated with the neighbor satellite 408 and the neighbor GW 410) during the MG. In one aspect, at 620, if the UE 602 determines that the UL channel/signal is to be prioritized over the MG, the UE 602 may transmit a set of UL repetitions in slots corresponding to the MG.

FIG. 7 is a flowchart 700 of a method of wireless communication. The method may be performed by a UE (e.g., the UE 104, the UE 350, the UE 602, the apparatus 1104). The method may be associated with various advantages at the UE, such as increased transmission of UL transmissions which may lead to increased cell coverage. In an example, the method may be performed by the MG component 198.

At 702, the UE transmits at least one of a first indication including UE capability information indicating that the UE is capable of UL transmission during one or more MGs or a second indication including information indicating a first set of slots corresponding to the one or more MGs. For example, FIG. 6 at 606 shows that the UE 602 may transmit UE capability information (i.e., a first indication) and FIG. 6 at 608 shows that the UE 602 may transmit a UL gap request for the UL collision pattern (i.e., a second indication). In another example, the first set of slots may be slots in the UE UL Tx slots 506 corresponding to the first MG 510 or the second MG 512 depicted in FIG. 5. In an example, 702 may be performed by the MG component 198.

At 704, the UE obtains a configuration to transmit a set of UL transmissions based on at least one of the first indication or the second indication. For example, FIG. 6 at 610 shows the UE 602 may obtain a configuration to transmit a set of UL repetitions based on the UE capability information transmitted at 606 or the UL gap request for the UL collision pattern transmitted at 608. In another example, the set of UL transmissions may be repetitions corresponding to the first collision 518 or the second collision 520 illustrated in the UE UL Tx slots 506 in FIG. 5. In an example, 704 may be performed by the MG component 198.

At 706, the UE transmits, based on the configuration, the set of UL transmissions in the first set of slots corresponding to the one or more MGs. For example, FIG. 6 at 614 shows that the UE 602 may transmit a set of UL repetitions in slots corresponding to one or more MGs based on the configuration received at 610. In an example, the first set of slots may be slots in the UE UL Tx slots 506 corresponding to the first MG 510 or the second MG 512 depicted in FIG. 5. In an example, 706 may be performed by the MG component 198.

Figure 8:
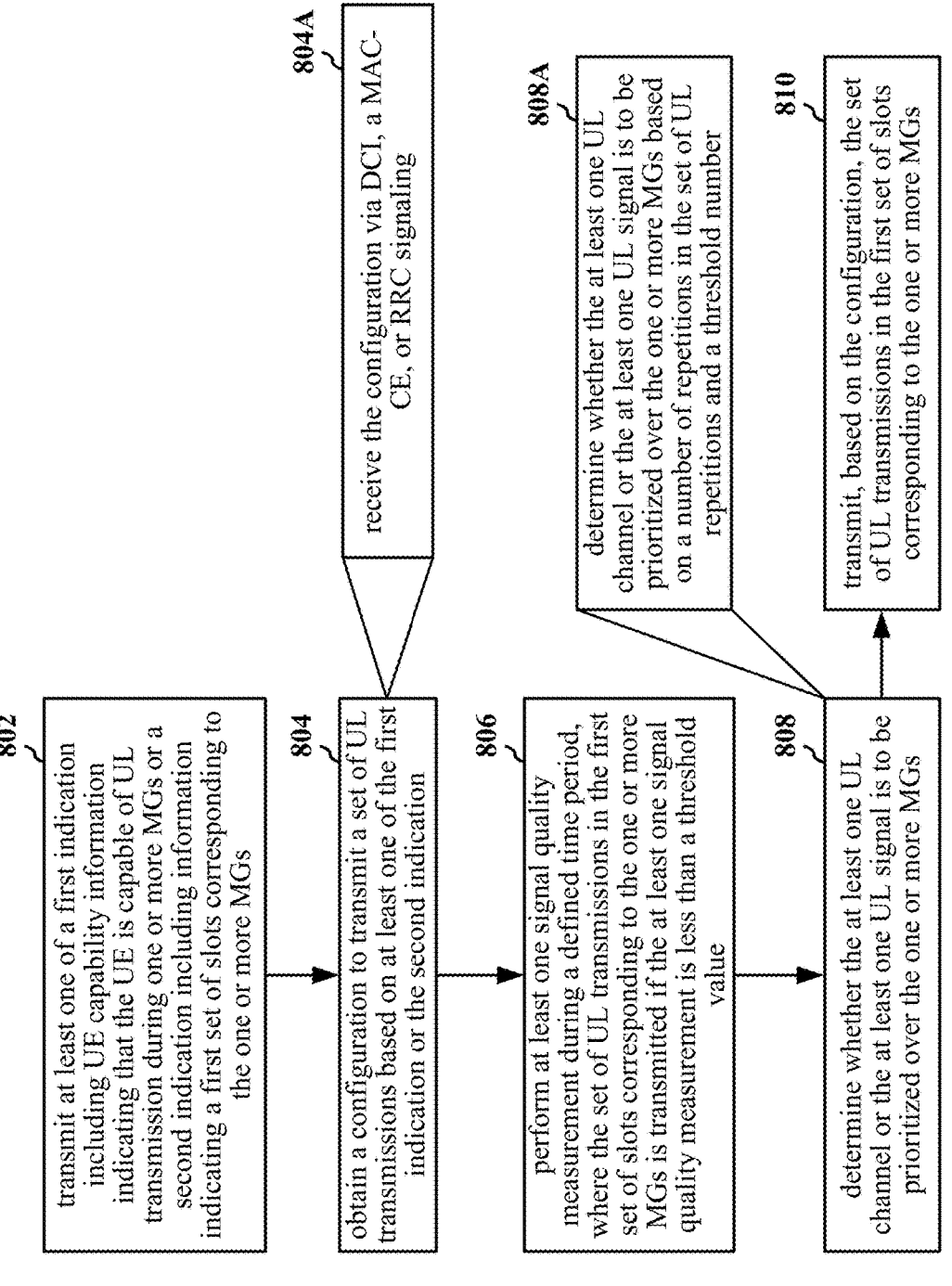
FIG. 8 is a flowchart of a method of wireless communication.

FIG. 8 is a flowchart 800 of a method of wireless communication. The method may be performed by a UE (e.g., the UE 104, the UE 350, the UE 602, the apparatus 1104). The method may be associated with various advantages at the UE, such as increased transmissions of UL transmissions which may lead to increased cell coverage. In an example, the method (including the various aspects described below) may be performed by the MG component 198.

At 802, the UE transmits at least one of a first indication including UE capability information indicating that the UE is capable of UL transmission during one or more MGs or a second indication including information indicating a first set of slots corresponding to the one or more MGs. For example, FIG. 6 at 606 shows that the UE 602 may transmit UE capability information (i.e., a first indication) and FIG. 6 at 608 shows that the UE 602 may transmit a UL gap request for the UL collision pattern (i.e., a second indication). In another example, the first set of slots may be slots in the UE UL Tx slots 506 corresponding to the first MG 510 or the second MG 512 depicted in FIG. 5. In an example, 802 may be performed by the MG component 198.

At 804, the UE obtains a configuration to transmit a set of UL transmissions based on at least one of the first indication or the second indication. For example, FIG. 6 at 610 shows the UE 602 may obtain a configuration to transmit a set of UL repetitions based on the UE capability information transmitted at 606 or the UL gap request for the UL collision pattern transmitted at 608. In another example, the set of UL transmissions may be repetitions corresponding to the first collision 518 or the second collision 520 illustrated in the UE UL Tx slots 506 in FIG. 5. In an example, 804 may be performed by the MG component 198.

At 810, the UE transmits, based on the configuration, the set of UL transmissions in the first set of slots corresponding to the one or more MGs. For example, FIG. 6 at 614 shows that the UE 602 may transmit a set of UL repetitions in slots corresponding to one or more MGs based on the configuration received at 610. In an example, the first set of slots may be slots in the UE UL Tx slots 506 corresponding to the first MG 510 or the second MG 512 depicted in FIG. 5. In an example, 810 may be performed by the MG component 198.

In one aspect, the set of UL transmissions includes a set of UL repetitions and the set of UL repetitions may be transmitted via at least one UL channel, and the set of UL repetitions may include at least one UL signal. For example, the repetitions illustrated in FIG. 5 may be transmitted via at least one channel and may include at least one UL signal.

In one aspect, at 808, the UE may determine whether the at least one UL channel or the at least one UL signal is to be prioritized over the one or more MGs. For example, FIG. 6 at 616 shows that the UE 602 may determine whether a UL channel/signal is to be prioritized over a MG. In an example, 808 may performed by the MG component 198.

In one aspect, the set of UL repetitions may be transmitted in the first set of slots corresponding to the one or more MGs if the at least one UL channel or the at least one UL signal is to be prioritized over the one or more MGs. For example, FIG. 6 at 620 shows that the UE 602 may transmit a set of UL repetitions in slots corresponding to one or more MGs if the UE 602 determines at 616 that the UL channel/signal is to be prioritized over the MG(s).

In one aspect, the first set of slots may exclude slots corresponding to the one or more MGs if the one or more MGs is to be prioritized over the at least one UL channel or the at least one UL signal. In an example, if the UE 602 determines at 616 that the one or more MGs are to be prioritized over the UL channel/signal, at 618, the UE 602 may drop UL repetitions.

In one aspect, at 808A, determining whether the at least one UL channel or the at least one UL signal is to be prioritized over the one or more MGs may include determining whether the at least one UL channel or the at least one UL signal is to be prioritized over the one or more MGs based on a number of repetitions in the set of UL repetitions and a threshold number. For example, FIG. 6 at 616 shows that determining whether the UL channel/signal is to be prioritized over the one or more MGs may include determining whether a number of repetitions is greater than a threshold. In an example, the at least one UL channel or the at least one UL signal may be prioritized over the one or more MGs if the number of repetitions in the set of UL repetitions is greater than a threshold number. In an example, 808A may performed by the MG component 198.

In one aspect, the set of UL transmissions may include one or more PUSCH transmissions. For example, FIG. 6 at 614 and 620 shows that the set of UL repetitions may be PUSCH repetitions. In another example, the repetitions illustrated in FIG. 5 in the UE UL Tx slots 506 may be PUSCH repetitions.

In one aspect, at least one of the first indication or the second indication and the set of UL transmissions may be transmitted via a NTN. For example, the NTN may be the NTN illustrated in FIG. 4.

In one aspect, the first set of slots corresponding to the one or more MGs may correspond to a defined time period. For example, as illustrated in FIG. 5, the first set of slots may correspond to a defined time period of 6 ms. Furthermore, as illustrated in FIG. 5, the first set of slots may correspond to the first MG 510 or the second MG 512.

In one aspect, at 806, the UE may perform at least one signal quality measurement during a defined time period and the set of UL transmissions in the first set of slots corresponding to the one or more MGs may be transmitted if at least one signal quality measurement (e.g., an EVM measurement) is less than a threshold value. For example, FIG. 6 at 612 shows that the UE 602 may perform a signal quality measurement on a serving cell associated with the base station 604. Furthermore, the UE 602 may transmit the set of UL repetitions at 614 if the signal quality measurement is less than a threshold value. In an example, 806 may be performed by the MG component 198.

In one aspect, the UE capability information may correspond to a band-combination format. For example, referring to FIG. 6, the UE capability information transmitted at 606 may be in a band-combination format.

In one aspect, at 804A, obtaining the configuration to transmit the set of UL transmissions based on at least one of the first indication or the second indication may include receiving the configuration via DCI, a MAC-CE, or RRC signaling. For example, FIG. 6 at 610 shows that the configuration may be received via DCI, MAC-CE, or RRC signaling. In an example, 804A may be performed by the MG component 198.

In one aspect, the second indication including the information indicating the first set of slots corresponding to the one or more MGs may indicate a UL gap request for a UL collision pattern, where the UL collision pattern may indicate that a configured MG collides with a first UL transmission, where the UL collision pattern is associated with a timing advance (TA) of the UE. For example, FIG. 6 at 608 shows that the UE 602 may transmit a UL gap request for a UL collision pattern. In another example, FIG. 5 shows that the first MG 510 and the second MG 512 may collide with scheduled UL repetitions depicted in the UE UL Tx slots 506. In another example, the TA may be the TA illustrated in FIG. 5.

In one aspect, the configured MG may collide with the UL transmission based on at least one signal quality measurement and a threshold value. For example, referring to FIG. 5, a configured MG may collide with a scheduled UL repetition if the signal quality measurement performed at 612 is greater than a threshold value.

In one aspect, the UL gap request for the UL collision pattern may be defined based on one or more of: at least one offset, at least one duration, or at least one periodicity. For example, referring to FIG. 6, the UL gap request for the UL collision pattern transmitted at 608 may be defined by an offset, a duration, and a periodicity. In another example, the UL gap request for the UL collision pattern may be defined by the first MG offset 514 and/or the second MG offset 516, a duration of a MG as illustrated in FIG. 5, or a periodicity of a MG as illustrated in FIG. 5.

In one aspect, the at least one duration may be represented by at least one bitmap having a first length which is less than or equal to a second length of the at least one periodicity. For example, the at least one duration may be represented by a bitmap having a first length (i.e., first bits) less than or equal to a second length (i.e., second bits) of a periodicity as illustrated in FIG. 5.

In one aspect, a second set of slots may correspond to the one or more MGs and the set of UL transmissions may not be transmitted in the second set of slots. For example, referring to FIG. 5, slots in the UE UL Tx slots 506 corresponding to the first MG 510 may include first slots and second slots. UL transmissions may be transmitted in the first slots and UL transmissions may not be transmitted in the second slots.

FIG. 9 is a flowchart 900 of a method of wireless communication. The method may be performed by a network node (e.g., the base station 102, the base station 310, the base station 604, the network entity 1202). The method may be associated with various advantages at the network node, such as increased reception of UL transmissions at the network node. In an example, the method may be performed by the MG component 199.

At 902, the network node receives at least one of a first indication including UE capability information indicating that a UE is capable of UL transmission during one or more MGs or a second indication including information indicating a first set of slots corresponding to the one or more MGs. For example, FIG. 6 at 606 shows that the base station 604 may receive UE capability information (i.e., a first indication) and FIG. 6 at 608 shows that the base station 604 may receive a UL gap request for a UL collision pattern (i.e., a second indication). In another example, the first set of slots may be slots in the UE UL Tx slots 506 corresponding to the first MG 510 or the second MG 512 depicted in FIG. 5. In an example, 902 may be performed by the MG component 199.

At 904, the network node transmits, for the UE, a configuration to transmit a set of UL transmissions based on at least one of the first indication or the second indication. For example, FIG. 6 at 610 shows that the base station 604 may transmit a configuration to transmit a set of UL repetitions based on the UE capability information received at 606 or the UL gap request for the UL collision pattern received at 608. In another example, the set of UL transmissions may be repetitions corresponding to the first collision 518 or the second collision 520 illustrated in the UE UL Tx slots 506 in FIG. 5. In an example, 904 may be performed by the MG component 199.

At 906, the network node receives, based on the configuration, the set of UL transmissions in a second set of slots associated with the first set of slots corresponding to the one or more MGs. For example, FIG. 6 at 614 shows that the base station 604 may receive a set of UL repetitions in slots corresponding to one or more MGs based on the configuration transmitted at 610. In an example, the second set of slots may be slots in the base station UL Rx slots 502 corresponding to the first MG 510 or the second MG 512 depicted in FIG. 5. In an example, 906 may be performed by the MG component 199.

Figure 10:
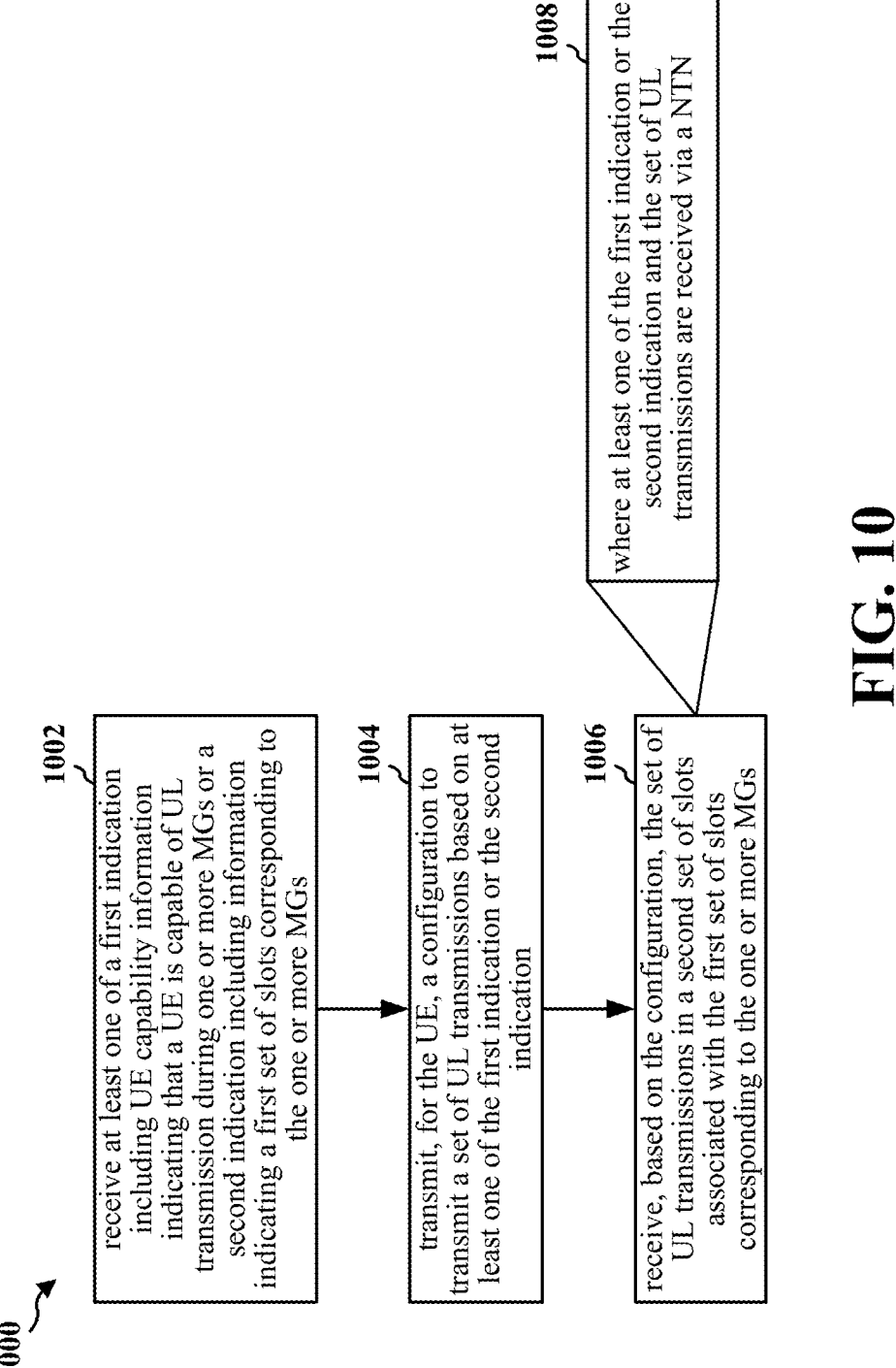
FIG. 10 is a flowchart of a method of wireless communication.

FIG. 10 is a flowchart 1000 of a method of wireless communication. The method may be performed by a network node (e.g., the base station 102, the base station 310, the base station 604, the network entity 1202). The method may be associated with various advantages at the network node, such as increased reception of UL transmissions at the network node. In an example, the method (including the various aspects described below) may be performed by the MG component 199.

At 1002, the network node receives at least one of a first indication including UE capability information indicating that a UE is capable of UL transmission during one or more MGs or a second indication including information indicating a first set of slots corresponding to the one or more MGs. For example, FIG. 6 at 606 shows that the base station 604 may receive UE capability information (i.e., a first indication) and FIG. 6 at 608 shows that the base station 604 may receive a UL gap request for a UL collision pattern (i.e., a second indication). In another example, the first set of slots may be slots in the UE UL Tx slots 506 corresponding to the first MG 510 or the second MG 512 depicted in FIG. 5. In an example, 1002 may be performed by the MG component 199.

At 1004, the network node transmits, for the UE, a configuration to transmit a set of UL transmissions based on at least one of the first indication or the second indication. For example, FIG. 6 at 610 shows that the base station 604 may transmit a configuration to transmit a set of UL repetitions based on the UE capability information received at 606 or the UL gap request for the UL collision pattern received at 608. In another example, the set of UL transmissions may be repetitions corresponding to the first collision 518 or the second collision 520 illustrated in the UE UL Tx slots 506 in FIG. 5. In an example, 1004 may be performed by the MG component 199.

At 1006, the network node receives, based on the configuration, the set of UL transmissions in a second set of slots associated with the first set of slots corresponding to the one or more MGs. For example, FIG. 6 at 614 shows that the base station 604 may receive a set of UL repetitions in slots corresponding to one or more MGs based on the configuration transmitted at 610. In an example, the second set of slots may be slots in the base station UL Rx slots 502 corresponding to the first MG 510 or the second MG 512 depicted in FIG. 5. In an example, at 1006 may be performed by the MG component 199.

In one aspect, the set of UL transmissions includes a set of UL repetitions and the set of UL repetitions may be received via at least one UL channel, and the set of UL repetitions includes at least one UL signal. For example, the repetitions illustrated in FIG. 5 may be received via at least one channel and may include at least one UL signal.

In one aspect, the configuration may include criteria for a determination of whether the at least one UL channel or the at least one UL signal is to be prioritized over the one or more MGs. For example, FIG. 6 at 616 shows a determination of whether a UL channel/signal is to be prioritized over a MG, and the determination may be based on criteria included in the configuration transmitted at 610.

In one aspect, the set of UL repetitions may be received in the second set of slots associated with the first set of slots corresponding to the one or more MGs if the at least one UL channel or the at least one UL signal is to be prioritized over the one or more MGs. For example, FIG. 6 at 620 shows that the base station 604 may receive a set of UL repetitions in slots corresponding to one or more MGs if it is determined at 616 that the UL channel/signal is to be prioritized over the one or more MGs.

In one aspect, the second set of slots may exclude slots corresponding to the one or more MGs if the one or more MGs is to be prioritized over the at least one UL channel or the at least one UL signal. In an example, if it is determined at 616 that the one or more MGs are to be prioritized over the UL channel/signal, at 618, the second set of slots may exclude slots corresponding to the one or more MGs.

In one aspect, the criteria for the determination of whether the at least one UL channel or the at least one UL signal may be prioritized over the one or more MGs is based on a number of repetitions in the set of UL repetitions and a threshold number or a ratio of a total number of collisions to a total number of scheduled repetitions is greater than a threshold value, where the threshold value is greater than zero and less than one. For example, FIG. 6 at 616 shows that determining whether the UL channel/signal is to be prioritized over the one or more MGs may include determining whether a number of repetitions is greater than a threshold.

In one aspect, the set of UL transmissions may include one or more PUSCH transmissions. For example, FIG. 6 at 614 and 620 shows that the set of UL repetitions may be PUSCH repetitions. In another example, the repetitions illustrated in FIG. 5 in the UE UL Tx slots 506 may be PUSCH repetitions.

In one aspect, at 1008, at least one of the first indication or the second indication and the set of UL transmissions may be received via a NTN. For example, the NTN may be the NTN illustrated in FIG. 4.

In one aspect, the first set of slots corresponding to the one or more MGs may correspond to a defined time period. For example, as illustrated in FIG. 5, the first set of slots may correspond to a defined time period of 6 ms. Furthermore, as illustrated in FIG. 5, the first set of slots may correspond to the first MG 510 or the second MG 512.

In one aspect, the UE capability information may correspond to a band-combination format. For example, referring to FIG. 6, the UE capability information received at 606 may be in a band-combination format.

In one aspect, the configuration may be transmitted via DCI, a MAC-CE, or RRC signaling. For example, FIG. 6 at 610 shows that the configuration may be transmitted via DCI, MAC-CE, or RRC signaling.

In one aspect, the second indication including the information indicating the first set of slots corresponding to the one or more MGs may indicate a UL gap request for a UL collision pattern and the UL collision pattern may indicate that a configured MG collides with a first UL transmission, where the UL collision pattern is associated with a TA of the UE. For example, FIG. 6 at 608 shows that the base station 604 may receive a UL gap request for a UL collision pattern. In another example, FIG. 5 shows that the first MG 510 and the second MG 512 may collide with UL repetitions depicted in the UE UL Tx slots 506.

In one aspect, the UL gap request for the UL collision pattern may be defined based on one or more of: at least one offset, at least one duration, or at least one periodicity. For example, referring to FIG. 6, the UL gap request for the UL collision pattern received at 608 may be defined by an offset, a duration, and a periodicity. In another example, the UL gap request for the UL collision pattern may be defined by the first MG offset 514 and/or the second MG offset 516, a duration of a MG as illustrated in FIG. 5, or a periodicity of a MG as illustrated in FIG. 5.

In one aspect, the at least one duration may be represented by at least one bitmap having a first length which is less than or equal to a second length of the at least one periodicity. For example, the at least one duration may be represented by a bitmap having a first length (i.e., first bits) less than or equal to a second length (i.e., second bits) of a periodicity as illustrated in FIG. 5.

In one aspect, a third set of slots may correspond to the one or more MGs and the set of UL transmissions may not be received in the third set of slots. For example, referring to FIG. 5 slots in the base station UL Rx slots 502 may include first slots and second slots. UL transmissions may be received in the first slots and UL transmissions may not be received in the second slots.

Figure 11:
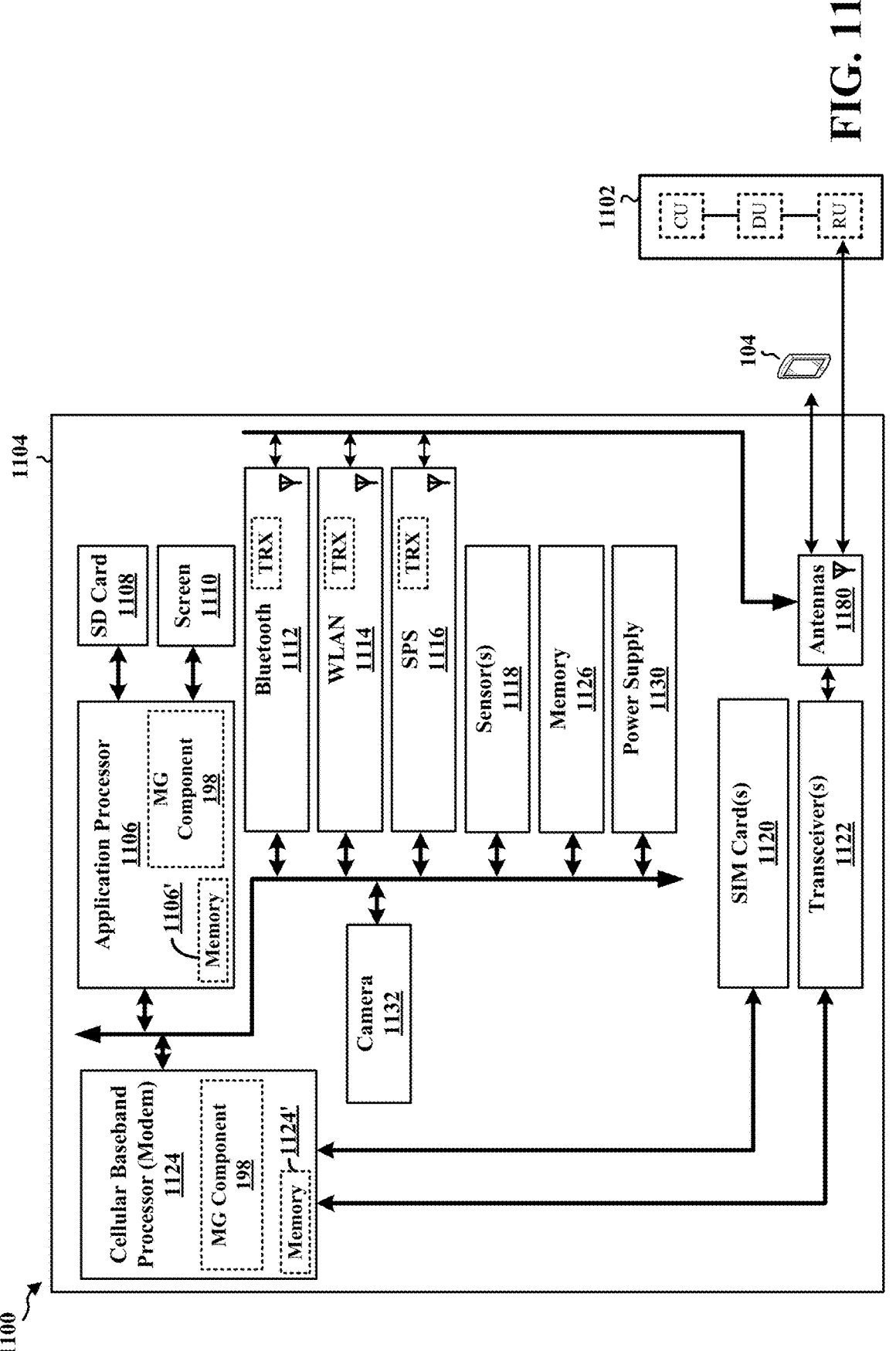
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer (s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include additional modules of the apparatus 1104.

As discussed supra, the MG component 198 is configured to transmit at least one of a first indication including UE capability information indicating that the UE is capable of UL transmission during one or more MGs or a second indication including information indicating a first set of slots corresponding to the one or more MGs. The MG component 198 is configured to obtain a configuration to transmit a set of UL transmissions based on at least one of the first indication or the second indication. The MG component 198 is configured to transmit, based on the configuration, the set of UL transmissions in the first set of slots corresponding to the one or more MGs. The MG component 198 may be within the cellular baseband processor 1124, the application processor 1106, or both the cellular baseband processor 1124 and the application processor 1106. The MG component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for transmitting at least one of a first indication including UE capability information indicating that the UE is capable of transmitting in UL during one or more MGs or a second indication including information indicating a first set of slots corresponding to the one or more MGs. In one configuration, the apparatus 1104, and in particular the cellular baseband processor 1124 and/or the application processor 1106, includes means for obtaining a configuration to transmit a set of UL transmissions based on at least one of the first indication or the second indication. In one configuration, the apparatus 1104, and in particular the cellular baseband processor 1124 and/or the application processor 1106, includes means for transmitting, based on the configuration, the set of UL transmissions in the first set of slots corresponding to the one or more MGs. In one configuration, the apparatus 1104, and in particular the cellular baseband processor 1124 and/or the application processor 1106, includes means for determining whether the at least one UL channel or the at least one UL signal is to be prioritized over the one or more MGs. In one configuration, the means for determining whether the at least one UL channel or the at least one UL signal is to be prioritized over the one or more MGs include means for determining whether the at least one UL channel or the at least one UL signal is to be prioritized over the one or more MGs based on a number of repetitions in the set of UL repetitions and a threshold number. In one configuration, the apparatus 1104, and in particular the cellular baseband processor 1124 and/or the application processor 1106, includes means for performing at least one signal quality measurement during a defined time period, where the set of UL transmissions in the first set of slots corresponding to the one or more MGs is transmitted if the at least one signal quality measurement is less than a threshold value. In one configuration, the means for obtaining the configuration to transmit the set of UL transmissions based on at least one of the first indication or the second indication include means for receiving the configuration via DCI, a MAC-CE, or RRC signaling. The means may be the MG component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
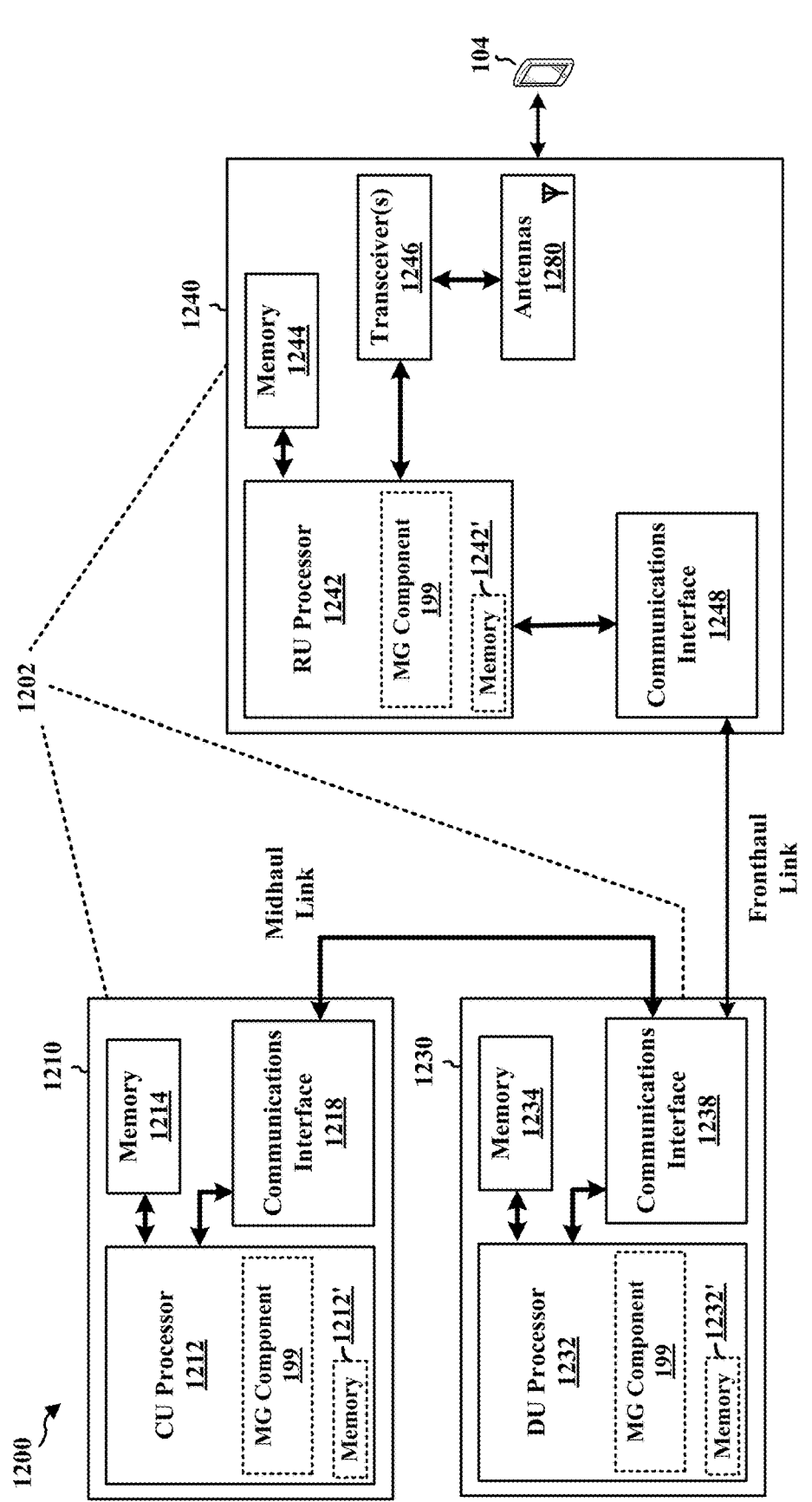
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the MG component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the MG component 199 is configured to receive at least one of a first indication including UE capability information indicating that a UE is capable of UL transmission during one or more MGs or a second indication including information indicating a first set of slots corresponding to the one or more MGs. The MG component 199 is configured to transmit, for the UE, a configuration to transmit a set of UL transmissions based on at least one of the first indication or the second indication. The MG component 199 is configured to receive, based on the configuration, the set of UL transmissions in a second set of slots associated with the first set of slots corresponding to the one or more MGs. The MG component 199 may be within one or more processors of one or more of the CU 1210, DU 1230, and the RU 1240. The MG component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for receiving at least one of a first indication including UE capability information indicating that a UE is capable of transmitting in UL during one or more MGs or a second indication including information indicating a first set of slots corresponding to the one or more MGs. In one configuration, the network entity 1202 includes means for transmitting, for the UE, a configuration to transmit a set of UL transmissions based on at least one of the first indication or the second indication. In one configuration, the network entity 1202 includes means for receiving, based on the configuration, the set of UL transmissions in a second set of slots associated with the first set of slots corresponding to the one or more MGs. The means may be the MG component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

As noted above, a UE may be configured/scheduled to dynamically or semi-statically transmit repetitions of a UL transmission (e.g., a PUSCH transmission) in order to increase cell coverage. However, the UE may not transmit repetitions of a UL transmission during a MG. Instead, the UE may switch carriers (e.g., to a carrier associated with a non-serving cell) and perform a measurement on the carrier. Stated differently, the UE may not transmit or receive data/signals from the serving cell during the MG. A base station may attempt to configure/schedule the UE to transmit UL repetitions that do not collide with MGs based on a TA of the UE; however, collisions may still occur even if the base station obtains/derives the TA with a granularity of 1 ms. If a MG collides with a configured/scheduled UL repetition, the UL repetition may be dropped by the UE, which may lead to a communications reliability issue between the UE and the base station.

Various technologies pertaining to minimizing dropping of UL repetitions due to collisions with MGs are described herein. In an example, a UE transmits at least one of a first indication including UE capability information indicating that the UE is capable of UL transmission during one or more MGs or a second indication including information indicating a first set of slots corresponding to the one or more MGs. The UE obtains a configuration to transmit a set of UL transmissions based on at least one of the first indication or the second indication. The UE transmits, based on the configuration, the set of UL transmissions in the first set of slots corresponding to the one or more MGs. Vis-à-vis transmitting the first indication and/or the second indication, the UE may be able to receive a configuration that may enable the UE to transmit the set of UL transmissions (e.g., UL repetitions) in the first set of slots corresponding to the one or more MGs. This may lead to the UE dropping less UL repetitions during MGs in comparison to other UEs, which may lead to increased communications reliability between the UE and a network, such as when the network is a NTN.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: transmitting at least one of a first indication including UE capability information indicating that the UE is capable of transmitting in UL during one or more MGs or a second indication including information indicating a first set of slots corresponding to the one or more MGs; obtaining a configuration to transmit a set of UL transmissions based on at least one of the first indication or the second indication; and transmitting, based on the configuration, the set of UL transmissions in the first set of slots corresponding to the one or more MGs.

Aspect 2 is the method of aspect 1, where the set of UL transmissions includes a set of UL repetitions, where the set of UL repetitions is transmitted via at least one UL channel, and where the set of UL repetitions includes at least one UL signal.

Aspect 3 is the method of aspect 2, further including: determining whether the at least one UL channel or the at least one UL signal is to be prioritized over the one or more MGs.

Aspect 4 is the method of aspect 3, where the set of UL repetitions is transmitted in the first set of slots corresponding to the one or more MGs if the at least one UL channel or the at least one UL signal is to be prioritized over the one or more MGs.

Aspect 5 is the method of aspect 4, where the first set of slots excludes slots corresponding to the one or more MGs if the one or more MGs is to be prioritized over the at least one UL channel or the at least one UL signal.

Aspect 6 is the method of any of aspects 3-5, where determining whether the at least one UL channel or the at least one UL signal is to be prioritized over the one or more MGs is based on a number of repetitions in the set of UL repetitions and a threshold number.

Aspect 7 is the method of any of aspects 1-6, where the set of UL transmissions includes one or more PUSCH transmissions.

Aspect 8 is the method of any of aspects 1-7, where at least one of the first indication or the second indication and the set of UL transmissions are transmitted via a NTN.

Aspect 9 is the method of any of aspects 1-8, where the first set of slots corresponding to the one or more MGs corresponds to a defined time period.

Aspect 10 is the method of any of aspects 1-9, further including: performing at least one signal quality measurement during a defined time period, where the set of UL transmissions in the first set of slots corresponding to the one or more MGs is transmitted if the at least one signal quality measurement is less than a threshold value.

Aspect 11 is the method of any of aspects 1-10, where the UE capability information corresponds to a band-combination format.

Aspect 12 is the method of any of aspects 1-11, where obtaining the configuration to transmit the set of UL transmissions based on at least one of the first indication or the second indication includes receiving the configuration via DCI, a MAC-CE, or RRC signaling.

Aspect 13 is the method of any of aspects 1-12, where the second indication including the information indicating the first set of slots corresponding to the one or more MGs indicates a UL gap request for a UL collision pattern, where the UL collision pattern indicates that a configured MG collides with a first UL transmission, where the UL collision pattern is associated with a TA of the UE.

Aspect 14 is the method of aspect 13, where the configured MG collides with the first UL transmission based on at least one signal quality measurement and a threshold value.

Aspect 15 is the method of any of aspects 13-14, where the UL gap request for the UL collision pattern is defined based on one or more of: at least one offset, at least one duration, or at least one periodicity.

Aspect 16 is the method of aspect 15, where the at least one duration is represented by at least one bitmap having a first length which is less than or equal to a second length of the at least one periodicity.

Aspect 17 is the method of any of aspects 1-16, where a second set of slots corresponds to the one or more MGs, where the set of UL transmissions are not transmitted in the second set of slots.

Aspect 18 is an apparatus for wireless communication at a UE including a memory and at least one processor coupled to the memory and based at least in part on first information stored in the memory, the at least one processor is configured to perform a method in accordance with any of aspects 1-17.

Aspect 19 is an apparatus for wireless communications, including means for performing a method in accordance with any of aspects 1-17.

Aspect 20 is the apparatus of aspect 18 or 19 further including at least one of a transceiver or an antenna coupled to the at least one processor, where the at least one processor is configured to transmit at least one of the first indication or the second indication and transmit the set of UL transmissions via at least one of the transceiver or the antenna.

Aspect 21 is a computer-readable medium (e.g., a non-transitory computer-readable medium) including instructions that, when executed by an apparatus, cause the apparatus to perform a method in accordance with any of aspects 1-17.

Aspect 22 is a method of wireless communication at a network node, including: receiving at least one of a first indication including UE capability information indicating that a UE is capable of transmitting in UL during one or more MGs or a second indication including information indicating a first set of slots corresponding to the one or more MGs; transmitting, for the UE, a configuration to transmit a set of UL transmissions based on at least one of the first indication or the second indication; and receiving, based on the configuration, the set of UL transmissions in a second set of slots associated with the first set of slots corresponding to the one or more MGs.

Aspect 23 is the method of aspect 22, where the set of UL repetitions is received via at least one UL channel, and where the set of UL repetitions includes at least one UL signal.

Aspect 24 is the method of aspect 23, where the set of UL transmissions includes a set of UL repetitions, where the configuration includes criteria for determining whether the at least one UL channel or the at least one UL signal is to be prioritized over the one or more MGs.

Aspect 25 is the method of aspect 24, where the set of UL repetitions is received in the second set of slots associated with the first set of slots corresponding to the one or more MGs if the at least one UL channel or the at least one UL signal is to be prioritized over the one or more MGs.

Aspect 26 is the method of aspect 25, where the second set of slots excludes slots corresponding to the one or more MGs if the one or more MGs is to be prioritized over the at least one UL channel or the at least one UL signal.

Aspect 27 is the method of any of aspects 24-26, where the criteria for determining whether the at least one UL channel or the at least one UL signal is to be prioritized over the one or more MGs is based on a number of repetitions in the set of UL repetitions and a threshold number or a ratio of a total number of collisions to a total number of scheduled repetitions is greater than a threshold value, wherein the threshold value is greater than zero and less than one.

Aspect 28 is the method of any of aspects 22-27, where the set of UL transmissions includes one or more PUSCH transmissions.

Aspect 29 is the method of any of aspects 22-28, where at least one of the first indication or the second indication and the set of UL transmissions are received via a NTN.

Aspect 30 is the method of any of aspects 22-29, where the first set of slots corresponding to the one or more MGs corresponds to a defined time period.

Aspect 31 is the method of any of aspects 22-30, where the UE capability information corresponds to a band-combination format.

Aspect 32 is the method of any of aspects 22-31, where the configuration is transmitted via DCI, a MAC-CE, or RRC signaling.

Aspect 33 is the method of any of aspects 22-32, where the second indication including the information indicating the first set of slots corresponding to the one or more MGs indicates a UL gap request for a UL collision pattern, where the UL collision pattern indicates that a configured MG collides with a first UL transmission, where the UL collision pattern is associated with a TA of the UE.

Aspect 34 is the method of aspect 33, where the UL gap request for the UL collision pattern is defined based on one or more of: at least one offset, at least one duration, or at least one periodicity.

Aspect 35 is the method of aspect 34, where the at least one duration is represented by at least one bitmap having a first length which is less than or equal to a second length of the at least one periodicity.

Aspect 36 is the method of any of aspects 22-35, where a third set of slots corresponds to the one or more MGs, where the set of UL transmissions are not received in the third set of slots.

Aspect 37 is an apparatus for wireless communication at a network node including a memory and at least one processor coupled to the memory and based at least in part on first information stored in the memory, the at least one processor is configured to perform a method in accordance with any of aspects 22-36.

Aspect 38 is an apparatus for wireless communications, including means for performing a method in accordance with any of aspects 22-36.

Aspect 39 is the apparatus of aspect 37 or 38 further including at least one of a transceiver or an antenna coupled to the at least one processor, where the at least one processor is configured to receive at least one of the first indication or the second indication and receive the set of UL transmissions via at least one of the transceiver or the antenna.

Aspect 40 is a computer-readable medium (e.g., a non-transitory computer-readable medium) including instructions that, when executed by an apparatus, cause the apparatus to perform a method in accordance with any of aspects 22-36.

What is claimed is:

1. An apparatus for wireless communication at a user equipment (UE), comprising:
   memory; and
   at least one processor coupled to the memory and, based at least in part on first information stored in the memory, the at least one processor is configured to:
      transmit at least one of a first indication including UE capability information indicating that the UE is capable of uplink (UL) transmission during one or more measurement gaps (MGs) or a second indication including information indicating a first set of slots corresponding to the one or more MGs;
      obtain a configuration to transmit a set of UL transmissions based on at least one of the first indication or the second indication, wherein the set of UL transmissions corresponds to a set of UL repetitions for one or more UL transmissions of the set of UL transmissions; and
      transmit, based on the configuration, the set of UL transmissions in the first set of slots corresponding to the one or more MGs.

2. The apparatus of claim 1, wherein the set of UL transmissions includes the set of UL repetitions, wherein to transmit the set of UL repetitions, the at least one processor is configured to transmit the set of UL repetitions via at least one UL channel, and wherein the set of UL repetitions includes at least one UL signal.

3. The apparatus of claim 2, wherein the at least one processor is further configured to
   determine whether the at least one UL channel or the at least one UL signal is to be prioritized over the one or more MGs.

4. The apparatus of claim 3, wherein to transmit the set of UL repetitions, the at least one processor is configured to transmit the set of UL repetitions in the first set of slots corresponding to the one or more MGs if the at least one UL channel or the at least one UL signal is to be prioritized over the one or more MGs.

5. The apparatus of claim 4, wherein the at least one processor is configured to exclude, from the first set of slots, slots corresponding to the one or more MGs if the one or more MGs is to be prioritized over the at least one UL channel or the at least one UL signal.

6. The apparatus of claim 3, wherein to determine whether the at least one UL channel or the at least one UL signal is to be prioritized over the one or more MGs, the at least one processor is configured to:
   determine whether the at least one UL channel or the at least one UL signal is to be prioritized over the one or more MGs based on a number of repetitions in the set of UL repetitions and a threshold number.

7. The apparatus of claim 1, wherein the set of UL transmissions includes one or more physical uplink shared channel (PUSCH) transmissions.

8. The apparatus of claim 1, wherein to transmit at least one of the first indication or the second indication and the set of UL transmissions, the at least one processor is configured to transmit at least one of the first indication or the second indication and the set of UL transmissions via a non-terrestrial network (NTN).

9. The apparatus of claim 1, wherein the first set of slots corresponding to the one or more MGs corresponds to a defined time period.

10. The apparatus of claim 1, wherein the at least one processor is further configured to:

perform at least one signal quality measurement during a defined time period, wherein the set of UL transmissions in the first set of slots corresponding to the one or more MGs is transmitted if the at least one signal quality measurement is less than a threshold value.

11. The apparatus of claim 1, wherein the UE capability information corresponds to a band-combination format.

12. The apparatus of claim 1, wherein to obtain the configuration to transmit the set of UL transmissions based on at least one of the first indication or the second indication, the at least one processor is configured to:

receive the configuration via downlink control information (DCI), a medium access control (MAC) control element (MAC-CE), or radio resource control (RRC) signaling.

13. The apparatus of claim 1, wherein the second indication including the information indicating the first set of slots corresponding to the one or more MGs indicates a UL gap request for a UL collision pattern, wherein the UL collision pattern indicates that a configured MG collides with a first UL transmission, wherein the UL collision pattern is associated with a timing advance (TA) of the UE.

14. The apparatus of claim 13, wherein the configured MG collides with the first UL transmission based on at least one signal quality measurement and a threshold value.

15. The apparatus of claim 13, wherein the UL gap request for the UL collision pattern is defined based on one or more of:

at least one offset,
at least one duration, or
at least one periodicity.

16. The apparatus of claim 15, wherein the at least one duration is represented by at least one bitmap having a first length which is less than or equal to a second length of the at least one periodicity.

17. The apparatus of claim 1, wherein a second set of slots corresponds to the one or more MGs, wherein the set of UL transmissions are not transmitted in the second set of slots.

18. The apparatus of claim 1, further comprising at least one of a transceiver or an antenna coupled to the at least one processor, wherein the at least one processor is configured to transmit at least one of the first indication or the second indication and transmit the set of UL transmissions via at least one of the transceiver or the antenna.

19. A method of wireless communication at a user equipment (UE), comprising:

transmitting at least one of a first indication including UE capability information indicating that the UE is capable of uplink (UL) transmission during one or more measurement gaps (MGs) or a second indication including information indicating a first set of slots corresponding to the one or more MGs;

obtaining a configuration to transmit a set of UL transmissions based on at least one of the first indication or the second indication, wherein the set of UL transmissions corresponds to a set of UL repetitions for one or more UL transmissions of the set of UL transmissions; and transmitting, based on the configuration, the set of UL transmissions in the first set of slots corresponding to the one or more MGs.

20. An apparatus for wireless communication at a network node, comprising:

memory; and at least one processor coupled to the memory and, based at least in part on first information stored in the memory, the at least one processor is configured to:

receive at least one of a first indication including user equipment (UE) capability information indicating that a UE is capable of uplink (UL) transmission during one or more measurement gaps (MGs) or a second indication including information indicating a first set of slots corresponding to the one or more MGs;

transmit, for the UE, a configuration to transmit a set of UL transmissions based on at least one of the first indication or the second indication, wherein the set of UL transmissions corresponds to a set of UL repetitions for one or more UL transmissions of the set of UL transmissions; and receive, based on the configuration, the set of UL transmissions in a second set of slots associated with the first set of slots corresponding to the one or more MGs.

21. The apparatus of claim 20, wherein the set of UL transmissions includes the set of UL repetitions, wherein to receive the set of UL repetitions, the at least one processor is configured to receive the set of UL transmissions via at least one UL channel, and wherein the set of UL repetitions includes at least one UL signal.

22. The apparatus of claim 21, wherein the configuration includes criteria for a determination of whether the at least one UL channel or the at least one UL signal is to be prioritized over the one or more MGs.

23. The apparatus of claim 22, wherein to receive the set of UL transmissions, the at least one processor is configured to receive the set of UL transmissions in the second set of slots associated with the first set of slots corresponding to the one or more MGs if the at least one UL channel or the at least one UL signal is to be prioritized over the one or more MGs.

24. The apparatus of claim 23, wherein slots corresponding to the one or more MGs are excluded from the second set of slots if the one or more MGs is to be prioritized over the at least one UL channel or the at least one UL signal.

25. The apparatus of claim 22, wherein the criteria for the determination of whether the at least one UL channel or the at least one UL signal is to be prioritized over the one or more MGs is based on a number of repetitions in the set of UL repetitions and a threshold number or a ratio of a total number of collisions to a total number of scheduled repetitions is greater than a threshold value, wherein the threshold value is greater than zero and less than one.

26. The apparatus of claim 20, wherein the set of UL transmissions includes one or more physical uplink shared channel (PUSCH) transmissions.

27. The apparatus of claim 20, wherein to receive at least one of the first indication or the second indication and the set of UL transmissions, the at least one processor is configured to receive at least one of the first indication or the second indication and the set of UL transmissions via a non-terrestrial network (NTN).

28. The apparatus of claim 20, wherein the first set of slots corresponding to the one or more MGs corresponds to a defined time period.

29. The apparatus of claim 20, further comprising at least one of a transceiver or an antenna coupled to the at least one processor, wherein the at least one processor is configured to receive at least one of the first indication or the second indication and receive the set of UL transmissions via at least one of the transceiver or the antenna.

30. A method of wireless communication at a network node, comprising:

receiving at least one of a first indication including user equipment (UE) capability information indicating that a UE is capable of uplink (UL) transmission during one or more measurement gaps (MGs) or a second indication including information indicating a first set of slots corresponding to the one or more MGs;

transmitting, for the UE, a configuration to transmit a set of UL transmissions based on at least one of the first indication or the second indication, wherein the set of UL transmissions corresponds to a set of UL repetitions for one or more UL transmissions of the set of UL transmissions; and receiving, based on the configuration, the set of UL transmissions in a second set of slots associated with the first set of slots corresponding to the one or more MGs.

* * * * *